(12) United States Patent
Cumbie et al.

(10) Patent No.: US 11,278,892 B2
(45) Date of Patent: Mar. 22, 2022

(54) CHIP TO CHIP FLUIDIC INTERCONNECT

(71) Applicant: Hewlett-Packard Development Company, L.P., Spring, TX (US)

(72) Inventors: Michael W. Cumbie, Corvallis, OR (US); Viktor Shkolnikov, Palo Alto, CA (US); Chien-Hua Chen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 144 days.

(21) Appl. No.: 16/494,856

(22) PCT Filed: Apr. 21, 2017

(86) PCT No.: PCT/US2017/028744
§ 371 (c)(1),
(2) Date: Sep. 17, 2019

(87) PCT Pub. No.: WO2018/194635
PCT Pub. Date: Oct. 25, 2018

(65) Prior Publication Data
US 2020/0094247 A1  Mar. 26, 2020

(51) Int. Cl.
*B01L 3/00* (2006.01)
*B01L 7/00* (2006.01)
(Continued)

(52) U.S. Cl.
CPC ..... *B01L 3/50273* (2013.01); *B01L 3/502715* (2013.01); *B01L 3/502769* (2013.01);
(Continued)

(58) Field of Classification Search
CPC ........... B01L 3/50273; B01L 3/502715; B01L 3/502769; B01L 7/00; B01L 2200/0684;
(Continued)

(56) References Cited

U.S. PATENT DOCUMENTS 6,548,895 B1   4/2003  Benavides et al.
6,790,011 B1   9/2004  Le Pesant et al.
(Continued)

FOREIGN PATENT DOCUMENTS

CN    1499949      5/2004
CN    103170383    6/2013
(Continued)

OTHER PUBLICATIONS

Fan et al., Droplet-on-a-wristband: Chip-to-chip digital microfluidic interfaces between replaceable and flexible electrowetting modules, the Royal Society of Chemistry, Lab on a Chip, vol. 11, 2011, pp. 343-347.
(Continued)

*Primary Examiner* — Jennifer Wecker
*Assistant Examiner* — Oyeleye Alexander Alabi
(74) *Attorney, Agent, or Firm* — Thorpe North & Western LLP (57) ABSTRACT

A device may include a substrate, a first fluid processing chip, a second fluid processing chip, a tapered channel, and a fluid actuator. The first fluid processing chip may be disposed on the substrate and may process a micro-volume of fluid. The second fluid processing chip may be disposed on the substrate and co-planar with the first fluid processing chip. The second fluid processing chip may process at least a portion of the micro-volume of fluid. The tapered channel may be disposed between the first and second fluid processing chips to transport the at least the portion of the micro-volume of fluid from the first fluid processing chip to the second fluid processing chip. The fluid actuator may be disposed proximate to the tapered channel and may control movement of the at least the portion of the micro-volume of fluid within the tapered channel.

17 Claims, 6 Drawing Sheets

(51) Int. Cl.
*G01N 35/00* (2006.01)
*G01N 35/10* (2006.01)

(52) U.S. Cl.
CPC .......... *B01L 7/00* (2013.01); *G01N 35/00069* (2013.01); *B01L 2200/0684* (2013.01); *B01L 2300/047* (2013.01); *B01L 2300/06* (2013.01); *B01L 2300/0819* (2013.01); *B01L 2300/12* (2013.01); *B01L 2300/1827* (2013.01); *B01L 2400/0406* (2013.01); *B01L 2400/0442* (2013.01); *G01N 2035/00158* (2013.01); *G01N 2035/00237* (2013.01); *G01N 2035/1034* (2013.01)

(58) Field of Classification Search
CPC .......... B01L 2300/047; B01L 2300/06; B01L 2300/0819; B01L 2300/12; B01L 2300/1827; B01L 2400/0406; B01L 2400/0442; B01L 2400/0688; B01L 2400/086; G01N 35/00069; G01N 2035/00158; G01N 2035/00237; G01N 2035/1034; G01N 15/1484
See application file for complete search history.

(56) References Cited

U.S. PATENT DOCUMENTS

| | | |
|---|---|---|
| 6,821,819 B1 | 11/2004 | Benavides et al. |
| 7,524,464 B2 | 4/2009 | Ahn et al. |
| 7,547,380 B2 | 6/2009 | Velev |
| 7,658,829 B2 | 2/2010 | Kanagasaba et al. |
| 7,682,817 B2 | 3/2010 | Cohen et al. |
| 7,754,150 B2 | 7/2010 | Wada et al. |
| 8,021,961 B2 | 9/2011 | Sparks |
| 8,403,557 B2 | 3/2013 | Li et al. |
| 9,421,544 B2 | 8/2016 | Wang |
| 9,481,945 B2 | 11/2016 | Junckett et al. |
| 2003/0153119 A1 | 8/2003 | Nathan et al. |
| 2003/0183525 A1 | 10/2003 | Elrod et al. |
| 2003/0215335 A1 | 11/2003 | Crivelli |
| 2004/0028566 A1 | 2/2004 | Ko et al. |
| 2004/0163958 A1 | 8/2004 | Kao et al. |
| 2005/0196321 A1 | 9/2005 | Huang |
| 2007/0286773 A1 | 12/2007 | Schlautmann et al. |
| 2008/0169197 A1 | 7/2008 | McRuer et al. |
| 2008/0199362 A1 | 8/2008 | Chong et al. |
| 2008/0210306 A1 | 9/2008 | Xie et al. |
| 2009/0326279 A1 | 12/2009 | Tonkovich et al. |
| 2010/0018584 A1 | 1/2010 | Bransky et al. |
| 2010/0181195 A1 | 7/2010 | Garcia Tello |
| 2011/0020141 A1 | 1/2011 | Van Zon et al. |
| 2011/0220505 A1 | 9/2011 | Wang et al. |
| 2012/0298233 A1 | 11/2012 | Rothacher |
| 2013/0118901 A1 | 5/2013 | Pollack et al. |
| 2013/0121892 A1 | 5/2013 | Fuhrmann et al. |
| 2013/0206597 A1 | 8/2013 | Wang et al. |
| 2014/0051159 A1 | 2/2014 | Bergstedt et al. |
| 2014/0083858 A1 | 3/2014 | Teh et al. |
| 2015/0001083 A1 | 1/2015 | Martin et al. |
| 2015/0306598 A1 | 10/2015 | Khandros et al. |
| 2016/0296929 A1 | 10/2016 | Chen et al. |
| 2017/0141278 A1 | 5/2017 | Hamaguchi et al. |
| 2018/0015460 A1* | 1/2018 | Sells ................ B01L 3/502715 |

FOREIGN PATENT DOCUMENTS

| | | |
|---|---|---|
| CN | 104603595 | 5/2015 |
| CN | 105916689 | 8/2016 |
| DE | 102004011667 | 11/2005 |
| EP | 1643288 | 4/2006 |
| JP | 2003294770 | 10/2003 |
| JP | 2004000935 | 1/2004 |
| JP | 2005292092 | 10/2005 |
| JP | 2010539503 | 12/2010 |
| JP | 2012112724 | 6/2012 |
| JP | 2016153725 | 8/2016 |
| TW | 200534916 | 11/2005 |
| TW | 200911375 | 3/2009 |
| TW | 201525464 | 7/2015 |
| WO | 2005075081 | 8/2005 |
| WO | 2006044966 | 4/2006 |
| WO | 2009004533 | 1/2009 |
| WO | 2012085728 | 6/2012 |
| WO | 2014165373 | 10/2014 |
| WO | 2015019520 | 2/2015 |
| WO | 2016111251 | 7/2016 |
| WO | 2016122554 | 8/2016 |
| WO | 2016122572 | 8/2016 |

OTHER PUBLICATIONS

Brown et al., An Experimental Validation of the Pressure Capacity of a Modular Gasketless Microfluidic Interconnect, 18th International Conference on Miniaturized Systems for Chemistry and Life Sciences, 14CBMS-0001, Oct. 26-30, 2014, pp. 1665-1667.

Le et al., Fabrication of 25 um-filter microfluidic chip on silicon substrate, Advances in Natural Sciences: Nanoscience and Nanotechnology 8/1/015003, 2017, 11 pages.

Jung et al., A novel actuation method of transporting droplets by using electrical charging of droplet in a dielectric fluid, AIP Biomicrofluidics Fundamentals, Perspectives & Applications, 3(2): 022402, 2009, 7 pages.

Zhou et al., One-Step Injection Molding of Oste+Microfluidic Devices With Screw Threaded Ports, 18th International Conference on Miniaturized Systems for Chemistry and Life Sciences, 14CBMS-0001, Oct. 26-30, 2014, pp. 1671-1673.

Wood et al., Microfabricated high-throughput electronic particle detector, Review of Scientific Instruments 78, 104301, 2007, 6 pages.

Xu et al, A Droplet-Manipulation Method for Achieving High-Throughput in Cross-Referencing-Based Digital Microfluidic Biochips, IEEE Transaction on Computer-Aided Design of Integrated Circuits and Systems, vol. 27, No. 11, Nov. 2008, pp. 1905-1917.

International Search Report dated Dec. 28, 2017 for PCT/US2017/028744, Applicant Hewlett-Packard Development Company, L.P.

* cited by examiner

CHIP TO CHIP FLUIDIC INTERCONNECT

BACKGROUND

Analysis of micro-volumes of fluid is increasingly becoming used to test small samples (e.g., droplet) of fluid to determine its biological and/or chemical characteristics. Such a micro-volume of fluid may be introduced to a fluid processing chip (e.g., integrated circuit chip) that processes the micro-volume of fluid to determine if the micro-volume of fluid includes various chemicals and/or biological material. In some instances, this micro-volume of fluid is further processed by another fluid processing chip to determine if the micro-volume of fluid includes other various chemicals and/or biological material.

DETAILED DESCRIPTION

The disclosure relates to movement of micro-volumes of fluid between fluid processing chips. Examples include a device that may be comprised of a substrate, first and second fluid processing chips, a tapered channel, and a fluid actuator. The first fluid processing chip may be disposed on the substrate and may process a micro-volume of fluid. The second fluid processing chip may be disposed on the substrate and may be co-planar with the first processing chip. The second fluid processing chip may process at least a portion of the micro-volume of fluid. The tapered channel may be aligned with the first and second processing chips and may transport the at least the portion of the micro-volume of fluid from the first fluid processing chip to the second fluid processing chip via a directional net driving capillary force imbalanced within the tapered channel. The fluid actuator may be disposed proximate to the tapered channel and may control movement of the at least the portion of the micro-volume of fluid within the tapered channel from the first fluid processing chip to the second fluid processing chip. As a result, micro-volumes of fluid can be more easily moved between fluid processing chips. In some examples, the device may include a fluid port that allows fluid from a blister pack to move into a tapered channel for transport to a fluid processing chip. In some examples, the tapered channel is formed in the substrate. In other examples, the tapered channel is formed in a lid that is disposed on the substrate. In still other examples, the tapered channel is formed between the lid and the substrate.

The device may allow for elimination of tubing and external pumps that are used by other systems to transport fluid between fluid processing chips, which eliminates large dead volumes of fluid associated with such tubing Eliminating such dead volumes of fluid may reduce costs associated with unused volumes of high cost reagents and may reduce a sample size needed for processing.

Figure 1:
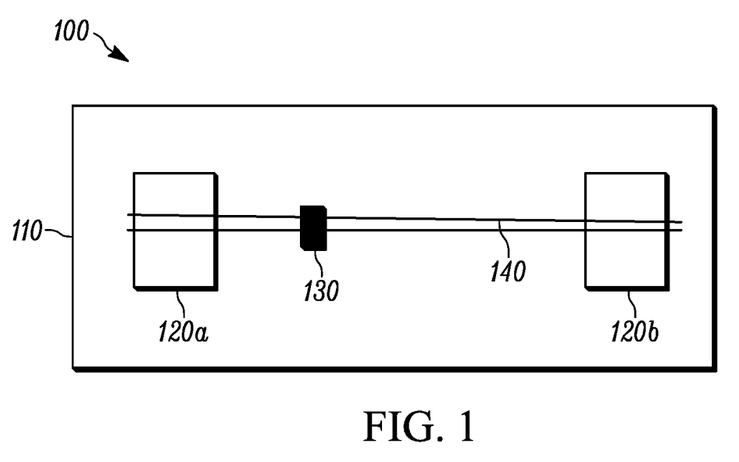
FIG. 1 illustrates an example device for transporting a micro-volume of fluid from a first fluid processing chip to a second fluid processing chip.

FIG. 1 illustrates an example device 100 for transporting a micro-volume of fluid from a first fluid processing chip 120a to a second fluid processing chip 120b. The device 100 may include a substrate 110. The device may further include a first fluid processing chip 120a that is disposed on the substrate 110. The first fluid processing chip 120a may process a micro-volume of fluid.

The device 100 may further include a second fluid processing chip 120b disposed on the substrate 110. The second fluid processing chip 120b may process a micro-volume of fluid. The second fluid processing chip 120b may be co-planar with the first fluid processing chip 120a and may process at least a portion of the micro-volume of fluid. The device 100 may further include a tapered channel 140 that is aligned with the first and second fluid processing chips 120a and 120b. The tapered channel 140 may transport the at least a portion of the micro-volume of fluid from the first fluid processing chip 120a to the second fluid processing chip 120b via a directional net driving capillary force imbalance within the tapered channel 140.

The device 100 may yet further include a fluid actuator 130 that may be proximate to the tapered channel 140. The fluid actuator 130 may control movement of the at least the portion of the micro-volume of fluid within the tapered channel 140 from the first fluid processing chip 120a to the second fluid processing chip 120b.

Figure 2A:
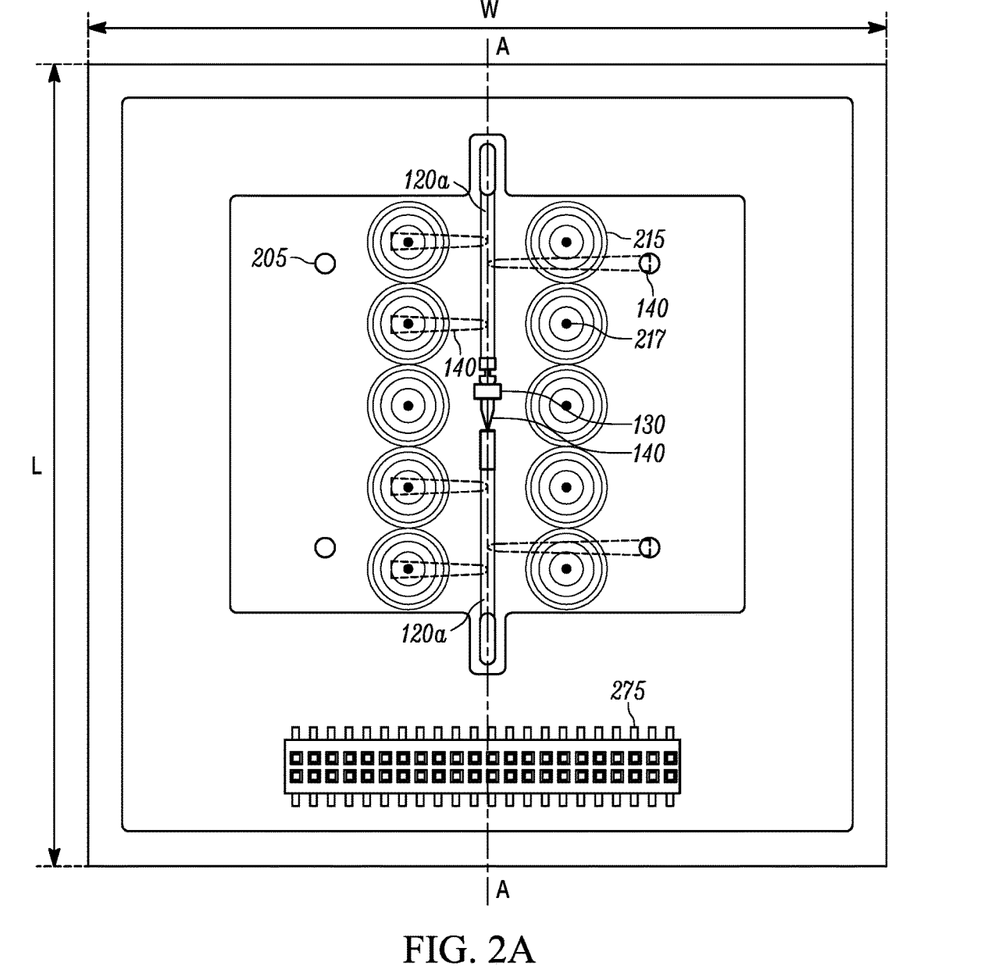
FIGS. 2a-c illustrate various views of another example device for transporting a micro-volume of fluid from a first fluid processing chip to a second fluid processing chip.
Figure 2B:
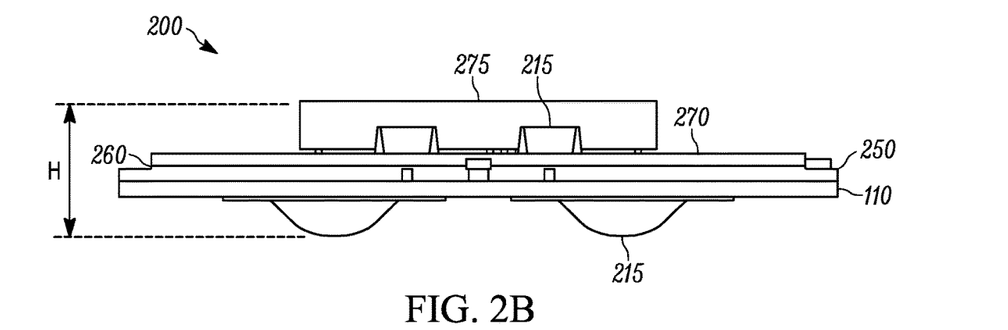
Figure 2C:
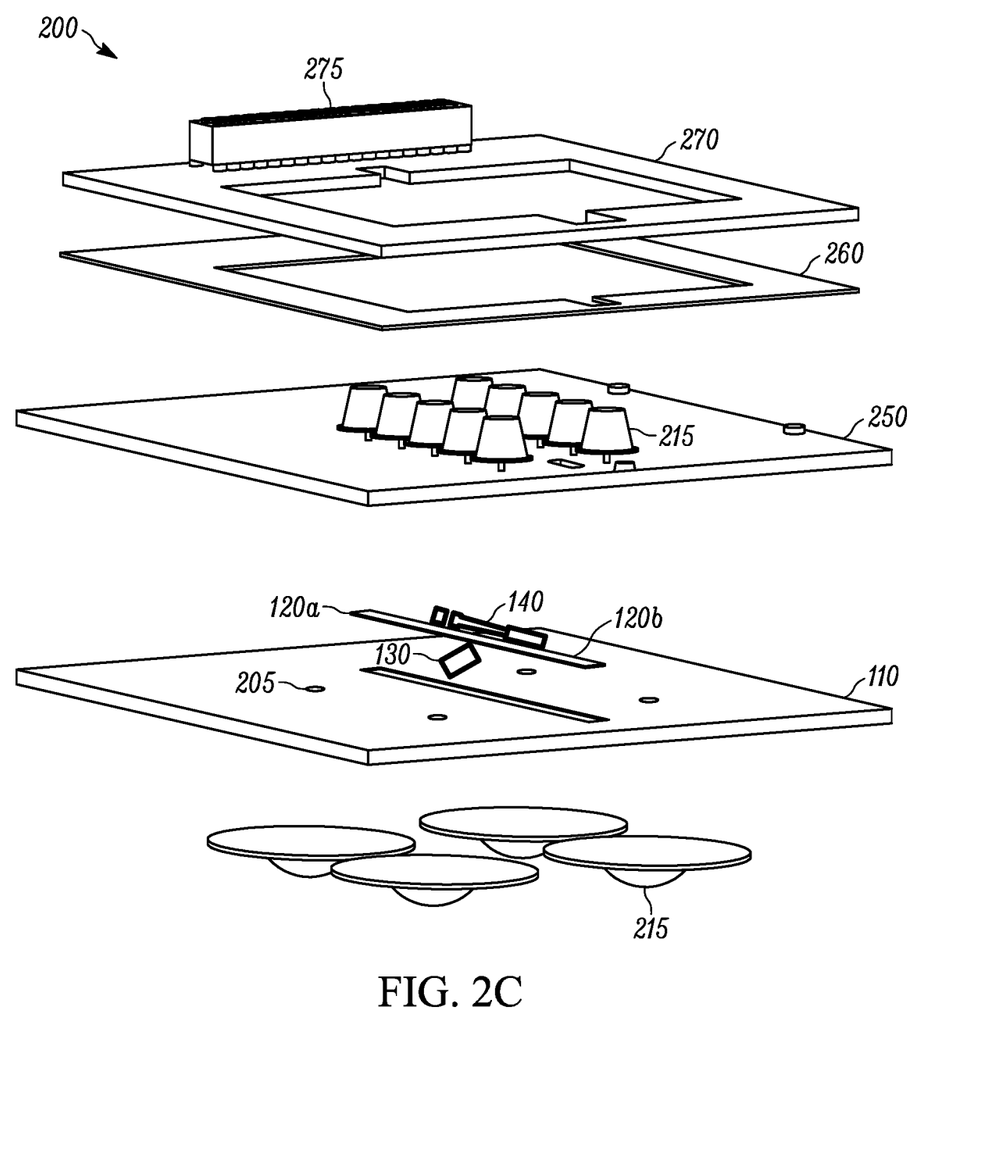

FIGS. 2a-c illustrate various views of another example device 200 for transporting a micro-volume of fluid from a first fluid processing chip 120a to a second fluid processing chip 120b. In particular, FIG. 2a illustrates a top view of the device 200, FIG. 2b illustrates a side view of the device 200, and FIG. 2c illustrates an exploded view of the device 200. In an example, the first and second fluid processing chips 120a and 120b may be any of silicon chips, glass chips, printed circuit board chips, or any other chip that is able to process a micro-volume of fluid. The device 200 may be a height H, a width W, and a length L. In an example, the height H may be 8.5 mm, the width W may be 45 mm, and the length L may be 45 mm. In an example, the fluid processing chip 120 may include one or more sensors or actuators to analyze or modify a micro-volume of fluid within the tapered channel 140 (e.g., a surface for enhanced Raman spectroscopy (SERS), a heater to perform polymerase chain reaction (PCR), etc.).

The device 200 may be constructed of a number of layers. For example, the bottom most layer of the device 200 may be the substrate 110. In an example, the substrate 110 may be an epoxy molded compound (EMC) substrate such as the type that are used to encapsulate semiconductor devices due to their high mechanical strength. Atop the substrate 110 may be disposed a lid 250. In an example, the lid 250 may be constructed of Cyclic olefin copolymer (COC). COC is a polymer that is used in microfluidics because of its ultraviolet (UV)-transparency, biocompatibility, low fluid absorption, and high chemical resistance. The lid 250 may be bonded to the substrate 110 via a mild bonding process that prevents biomolecule degradation of the COC material, e.g., thermal fusion bonding, solvent bonding, or any other bodying that prevents degradation of the COC material.

An adhesive layer 260 (e.g., pressure sensitive adhesive ((PSA)) and a printed circuit assembly (PSA) 270 may be disposed atop the lid 250, respectively. Together the adhesive layer 260 and the PSA 270 may form an electrical contact layer. Coupled to a top of the PSA 270 may be an electrical interface (EI) 275. In an example, the EI 275 may be a 44 pin input/output off board connecter that provides compatibility with a computer system using such a like opposite connector. The EI 275 may include individual pin connections that are electrically coupled to the first and second processing chips 120a and 120b and the fluid actuator 130. The EI 275 may electrically couple the computer system to the device 200 to apply an actuation voltage to the fluid actuator 130 and may electrically couple the computer system to the device 200 to read process results from the first and second processing chips 120a and 120b. Such an actuation voltage actuates the fluid actuator 130 to form a vapor drive bubble within a micro-volume of fluid within tapered channel 140.

The device 200 may include the first and second fluid processing chips 120a and 120b. The first and second fluid processing chips 120a and 120b may be positioned approximately in line with each other, with the tapered channel 140 disposed between and atop the first and second fluid processing chips 120a and 120b. The example device 200 is shown as including two (2) fluid processing chips 120. However, in another example the device 200 may include more or less fluid processing chips 120, depending upon application of device 200 to process particular micro-volumes of fluid. The fluid processing chips 120a and 120b may be positioned approximately along a centerline A-A of the device 200. However, in another example the fluid processing chip(s) 120 may be positioned anywhere on the substrate 110, dependent upon the layout of device 200.

The tapered channel 140 may include a degree of tapering, e.g., linear, exponential, etc. The tapered channel 140 may include a channel cross sectional area that reduces over the length of the tapered channel 140 in a continuous way as to ensure capillary driving force therein. In an example, this channel cross sectional area may be reduced via a reduction in the radius of the tapered channel 140 over the length of the tapered channel 140. In another example, the channel cross sectional area over the length of the tapered channel 140 may be reduced via a pillar structure or porous structure within the tapered channel 140, discussed in more detail below. The degree of taper of the tapered channel 140 is exaggerated for purposes of illustration, with the degree of taper from one end of the tapered channel 140 to another end of the tapered channel being relatively small while still providing the directional net driving capillary force imbalance within the tapered channel 140. In an example, the tapered channel 140 may be substantially straight. In another example, the tapered channel 140 may be non-straight (e.g., curved, "Z" shaped, angled, etc.).

The tapered channel 140 may be formed in the substrate 110 (e.g., embossed), may be formed in the lid 250 (e.g., embossed), or formed in a space between the substrate 110 and the lid 250. In an example where the tapered channel 140 may be formed between the substrate 110 and the lid 250, additional substrate material (e.g., EMC) may be deposited atop the substrate 110 and patterned (e.g., embossed) to form the tapered channel 140. Irrespective of where the tapered channel is formed, the tapered channel 140 may be co-planar with the first and second fluid processing chips 120a and 120b to allow for non-impeded (e.g., no step) transport between the first and second fluid processing chips 120a and 120b. Thus, the tapered channel 140 may interconnect the first and second fluid processing chips 120a and 120b. The tapered channel 140 may be disposed overtop of the first and second fluid processing chips 120a and 120b such that the first and second fluid processing chips 120a and 120b may process a micro-volume of fluid while such fluid remains within the tapered channel 140. In another example, the micro-volume within the tapered channel 140 may be pulled or pushed into a chamber that is disposed overtop of a fluid processing chip 120, with the fluid processing chip 120 then processing the fluid within the chamber, with such an embodiment shown in more detail in FIGS. 4 and 5.

The fluid actuator 130 may be positioned along the centerline A-A of the device 200 between the first and second fluid processing chips 120a and 120b. However, the fluid actuator 130 may be positioned anywhere on the substrate 210, dependent upon the position of the fluid processing chip(s) and the tapered channel 140 therebetween. Although a single fluid actuator 130 is illustrated in the example device 200, the device 200 may include more fluid actuators 130, dependent upon the number of tapered channels 140 that are used in a particular device to move a micro-volume of fluid. The fluid actuator 130 may be, for example, a thermal resistor based actuator, a piezo-membrane based actuator, an electrostatic membrane actuator, a mechanical/impact driven membrane actuator, a magnetostrictive drive actuator, and/or other such components that may control a movement of a micro-volume of fluid within the tapered channel(s) 140.

The device 200 may include one or more fluid reservoirs 215. The fluid reservoir 215 may be disposed on the co-planar surface (e.g., the substrate 110, the lid 250, etc.). In an example, the fluid reservoir 215 may be Luer connectors that may be coupled to a hose and/or a syringe from which a volume of fluid may be accessed. In another example, the fluid reservoir 215 may be a cup or a well from which a volume of fluid may be accessed. The lid 250 may include a plurality of apertures 217 that may extend through the lid 250 and line up with the plurality of fluid reservoir 215, respectively. The apertures 217 may traverse the lid 250 to allow fluid to pass through the lid 250 to a tapered channel 140 that lines up with the aperture 217. In an example, one or more of the plurality of fluid reservoirs 215 may remain unused. In such an instance, the tapered channels 140 may be omitted from the device 200 for such unused fluid reservoir 215. Although the fluid reservoirs 215 are illustrated as being positioned on either sides of the fluid processing chips 120a and 120b, the fluid reservoir 215 may be positioned anywhere on the device 200 dependent upon the position of the various other components (e.g., position of the first and second fluid processing chips 120a and 120b, etc.). The example device 200 is shown as including ten (10) fluid reservoirs 215. However, in another example the device 200 may include more or less fluid reservoir 215, depending upon application of device 200 to process particular micro-volumes of fluid.

The device 200 may include one or more fluid ports 205. The fluid ports 205 may be apertures that may extend through the substrate 110. The fluid ports 205 may be positioned to line up with additional fluid reservoirs 215 (e.g., a reservoir, a blister pack, etc.). The fluid ports 205 may be positioned to line up a tapered channel 140 that couples the fluid port 205 to a fluid processing chip 120. In an example, one or more of the plurality of fluid ports 205 may remain unused. In such an instance, the tapered channels 140 may be omitted from the device 200 for such unused fluid ports 205. Although the fluid ports 205 are illustrates as being positioned on either sides of the fluid processing chips 120a and 120b and the fluid reservoir 215, the fluid ports 205 may be positioned anywhere on the device 200 dependent upon the position of the various other components (e.g., position of the first and second fluid processing chips 120a and 120b, position of the fluid reservoir 215, etc.). The example device 200 is shown as including four (4) fluid ports 205. However, in another example the device 200 may include more or less fluid ports 205, depending upon application of device 200 to process particular micro-volumes of fluid.

Figure 3:
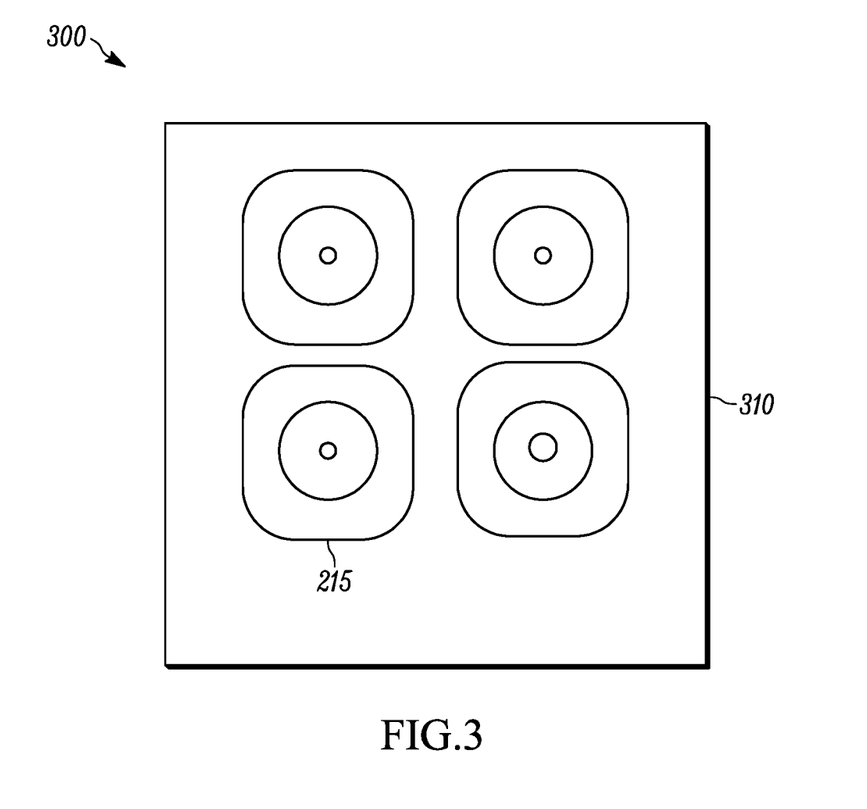
FIG. 3 illustrates an example blister pack that may be used with the device shown in FIGS. 2a-c.

FIG. 3 illustrates an example blister pack 300 that may be used with the device 200 shown in FIGS. 2a-c. In the example shown, the blister pack 300 may include four fluid reservoirs 215. In another example, the blister pack 300 may include more or less fluid reservoirs 215, depending upon application of device 200 to process particular micro-volumes of fluid. The blister pack 300 may be pressed onto a back surface of the device 200 to allow fluid from within the fluid reservoirs 215 to flow into the fluid ports 205. The fluid reservoirs 215 may be disposed on a panel 310 that may maintain a relative position of the fluid reservoirs 215 to each other and may lineup the fluid stores with the fluid ports 205.

Figure 4A:
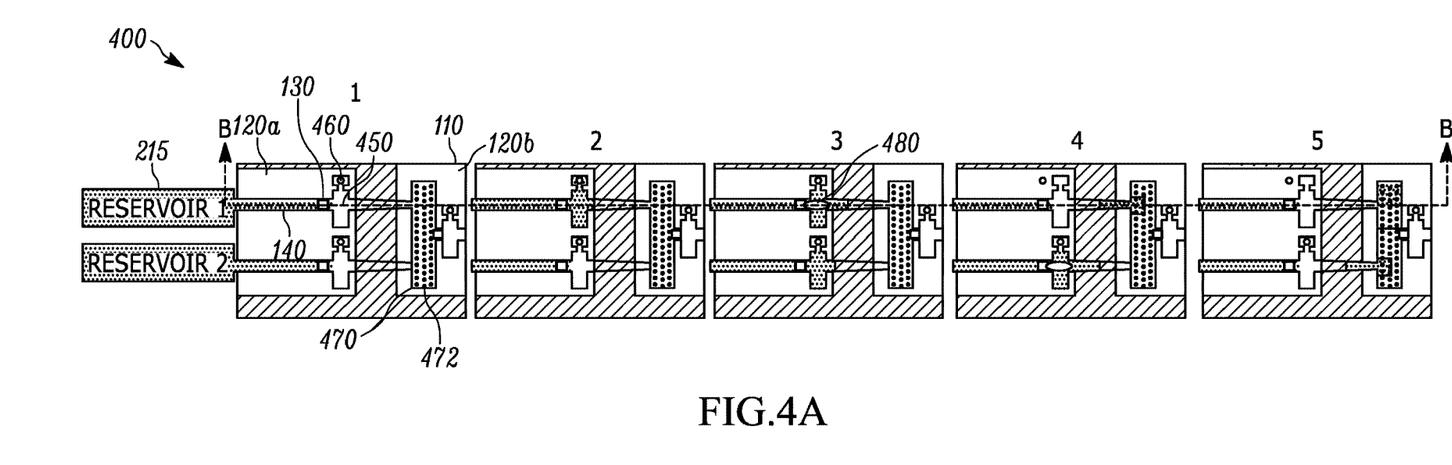
FIGS. 4a and 4b illustrate another example device that may perform a series of operations for transporting a micro-volume of fluid from a first fluid processing chip to a second fluid processing chip.
Figure 4B:
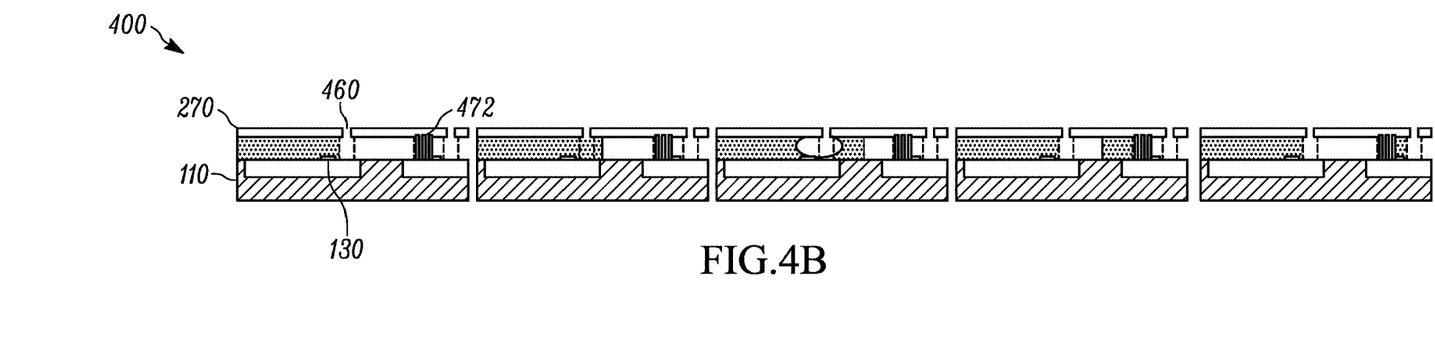

FIGS. 4a and 4b illustrate another example device 400 that may perform a series of operations for transporting a micro-volume of fluid between a first fluid processing chip 120a to a second fluid processing chip 120b. In particular, FIG. 4a illustrates a top view of the device 400 and FIG. 4b illustrates a cross sectional view of the device 400 illustrated in FIG. 4a with respect to line B-B.

The device 400 may include first and second fluid reservoirs 215 coupled to first and second tapered channels 140, respectively. In an example, the first and second tapered channels 140 may be disposed parallel to each other. In another example, the first and second tapered channels 140 may be disposed at other locations on the device 400 at different orientations with respect to each other.

The first and second fluid reservoirs 215 may include a volume of fluid that may be pulled individually or in combination to the first and second processing chips 120a and/or 120b. The device 400 may further include first and second channel breaks 450. The first and second channel breaks 450 may be disposed within a path of first and second tapered channels 140, respectively, all of which may be disposed atop the first fluid processing chip 120a. The first and second channel breaks 450 may break a path in the taper of the first and second tapered channels 140 to form first and second portion of the first and second tapered channels 140 such that the directional net driving capillary force imbalance within the first and second tapered channels 140 ends at a leading edge of the first and second channel breaks 450 and begins at a trailing edge of the first and second channel breaks 450. Thus, the micro-volume of fluid within the first and second tapered channels 140 may get pulled to the edge of the first and second channel breaks 450 and stop at such an edge. In other examples, the first and second channel breaks 450 may be disposed at other locations, for example, between the first and second processing chips 120a and 120b. First and second channel fluid actuators 130 (e.g, resistors) may be disposed proximate to the first and second tapered channels 140, respectively, just prior to the leading edges of the first and second channel breaks 450. The first and second fluid actuators 130 may be positioned a distance from the leading edge of the first and second channel breaks 450 such that a volume of fluid within this space within the first and second tapered channels 140 may be actuated by the fluid actuators 130. The channel break 450 is illustrated as being rectangular in shape. However, the channel break 450 may be other shapes (e.g., circular, rounded, square, etc.) that break a path in the taper of a tapered channel 140.

The device 400 may further include first and second air ports 460. The first and second air ports 460 may be coupled to the first and second tapered channels 140. In this example, the first and second air ports 460 may be coupled to the first and second channel breaks 450. Once a volume of microfluid moves past a trailing edge of the first and second channel breaks 450, back pressure may form on such a fluid to impede the flow of such fluid toward the second fluid processing chip 120b. The first and second air ports 460 may include an aperture that allows ambient air to enter the first and second channel breaks 450. The air entering the first and second channel breaks 450 may normalize such back pressure and may allow the micro-volume of fluid within the first and second tapered channels 140 to flow toward the second fluid processing chip 120b.

The device 400 may further include a fluid chamber 470. The fluid chamber 470 may be disposed atop the second fluid processing chip 120b and may be coupled to the first and second tapered channels 140. In another example, the fluid chamber 470 may be disposed at other locations that does not coincide with a fluid processing chip 120. The fluid chamber 470 may provide a space in which fluid from one or both of the first and second tapered channels 140 may collect to form a larger volume of fluid and/or may provide a space to mix fluids. The second fluid processing chip 120b may process the fluid that is within the fluid chamber 470. The fluid chamber 470 may include a plurality of pillar structures 472 that may be disposed therein. The pillar structures 472 may be spaced within the fluid chamber 470 to generate a directional net driving capillary force imbalance within the fluid chamber 470. This directional net driving capillary force imbalance within the fluid chamber 470 may pull fluid from one or both of the tapered channels into the fluid chamber 470. The second fluid processing chip 120b may process the fluid that is within the fluid chamber 470. The fluid chamber 470 is illustrated as being rectangular in shape. However, the fluid chamber 470 may be other shapes (e.g., circular, rounded, square, etc.) that provide a space in which fluid from one or both of the first and second tapered channels 140 may collect. In another example, the fluid chamber 470 may include a porous structure to generate a directional net driving capillary force imbalance within the fluid chamber 470. In another example, the tapered channel 140 may include the pillar structures 472 therein to generate a directional net driving capillary force imbalance within the tapered channel 140 via the pillar structure 472.

The device 400 may further include a third channel break 450 coupled to an output of the fluid chamber 470. In the short path between the fluid chamber 470 and the third channel break 450 may be a third fluid actuator 130. A third air port 460 may be coupled to the third channel break 450. The third fluid actuator 130 may control the flow of fluid from the fluid chamber 470. The device may include a third tapered channel 140 coupled to the third channel break 450.

In the example shown at a first (1) stage of operation of the device 400, at least a portion of the volume of fluid from both the first and second fluid reservoirs 215 may be pulled onto the first and second processing chips 120a and 120b. One or both of such micro-volumes of fluid may be processed by the first and second processing chips 120a and 120b. The volumes of micro-fluid pulled onto the first and second processing chips 120a and 120b stop at the leading edge of the first and second channel breaks 450, respectively.

At a second (2) stage of operation of the device 400, the first fluid actuator 130 may be actuated (e.g., heated) to form a vapor drive bubble (not shown) within the micro-volume of fluid within the first tapered channel 140 to push the micro-volume of fluid past the first channel break 450 in the first tapered channel 140. As illustrated, the micro-volume of fluid within the first tapered channel 140 then flows into and may fill the first channel break 450 to close the first tapered channel. The micro-volume of fluid may begin to enter the portion of the first tapered channel 140 just after the first channel break 450. The second fluid actuator 130 may remain inactive during the second stage.

At a third (3) stage of operation of the device 400, the first fluid actuator 130 may be overdriven (e.g., further heated) to form a vapor drive bubble 480 in the micro-volume of fluid within the first tapered channel 140. This vapor drive bubble 480 may prevent further fluid within the first tapered channel 140 and before the first fluid actuator 130 from flowing toward the first channel break 450. This vapor drive bubble 480 may further push a volume of the micro-volume of fluid that is positioned after the first fluid actuator 130 into the first tapered channel 140. The vapor drive bubble 480 may re-form a break within a path in the taper of the first tapered channel 140 such that the directional net driving capillary force imbalance within the first tapered channels 140 again ends at the leading edge of the first channel break 450 and again begins at a trailing edge of the first channel break 450. At the third (3) stage, the second fluid actuator 130 may be actuated (e.g., heated) to form a vapor drive bubble (not shown) within the micro-volume of fluid within the second tapered channel 140 to push the micro-volume of fluid past the second channel break 450 in the second tapered channel 140. As illustrated, this micro-volume of fluid within the second tapered channel 140 flows into and may fill the second channel break 450 to close the second tapered channel 140. This micro-volume of fluid may begin to enter the portion of the second tapered channel 140 just after the second channel break 450.

At a fourth (4) stage of operation of the device 400, the micro-volume of fluid that was pushed into the first tapered channel 140 in the third (3) stage moves along the first tapered channel 140 toward the fluid chamber 470. This micro-volume of fluid continues to move through the first tapered channel 140 as a result of the directional net driving capillary force imbalanced within the first tapered channel 140. This micro-volume of fluid may begin to move into the fluid chamber 470 as a result of the directional net driving capillary force imbalanced within the fluid chamber 470 created by the pillar structures 472. At the fourth (4) stage, the second fluid actuator 130 may be overdriven (e.g., further heated) to form a vapor drive bubble 480 in the micro-volume of fluid within the second tapered channel 140. This vapor drive bubble 480 may prevent further fluid within the second tapered channel 140 and before the second fluid actuator 130 from flowing toward the second channel break 450. This vapor drive bubble 480 may further push a volume of the micro-volume of fluid that is positioned after the second fluid actuator 130 into the second tapered channel 140. The vapor drive bubble 480 may re-form a break within a path in the taper of the second tapered channels 140 such that the directional net driving capillary force imbalance within the second tapered channel 140 again ends at the leading edge of the second channel break 450 and again begins at a trailing edge of the second channel break 450.

At a fifth (5) stage of operation of the device 400, the micro-volume of fluid that begins entering the fluid chamber 470 from the first tapered channel 140 in the fourth (4) stage completely moves out of the first tapered channel 140 and into the fluid chamber 470. At the fifth (5) stage, the micro-volume of fluid that was pushed into the second tapered channel 140 in the fourth (4) stage by the vapor drive bubble 480 moves along the second tapered channel 140 toward the fluid chamber 470. This micro-volume of fluid continues to move through the second tapered channel 140 as a result of the directional net driving capillary force imbalanced within the second tapered channel 140. This micro-volume of fluid may begin to move into the fluid chamber 470 as a result of the directional net driving capillary force imbalanced within the fluid chamber 470 generated by the pillar structures 472. Thus, the micro-volumes of fluid received by the fluid chamber 470 from the first and second tapered channels 140 may mix with a controlled ratio within the fluid chamber 470, as a result of controlled actuation of the first and second fluid actuators 130 atop the second fluid processing chip 120b. The second fluid processing chip 120b may process the micro-volumes of fluid that enter the fluid chamber 470 from the first and second tapered channels 140.

Figure 5:
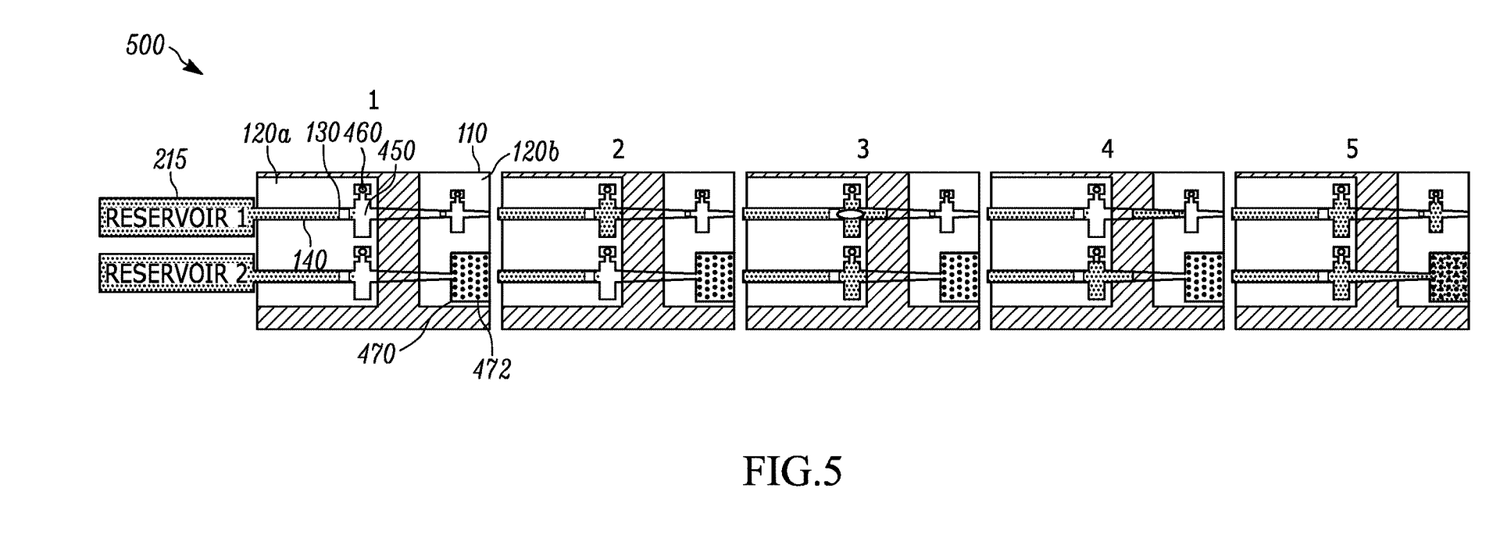
FIG. 5 illustrates a top view of another device that may perform a series of operations for transporting a micro-volume of fluid from a first fluid processing chip to a second fluid processing chip.

FIG. 5 illustrates a top view of another device 500 that may perform a series of operations for transporting a micro-volume of fluid from a first fluid processing chip 120a to a second fluid processing chip 120b.

The device 500 may include first and second fluid reservoirs 215 coupled to first and second tapered channels 140, respectively. In an example, the first and second tapered channels 140 may be disposed parallel to each other. The device 500 may further include first and second channel breaks 450. The first and second channel breaks 450 may be disposed within a path of first and second tapered channels 140, respectively, all of which may be disposed atop the first fluid processing chip 120a. First and second fluid actuators 130 (e.g., resistors) may be disposed proximate to the first and second tapered channels 140, respectively, just prior to the leading edges of the first and second channel breaks 450. The first and second fluid actuators 130 may be positioned a distance from the leading edge of the first and second channel breaks 450 such that a volume of fluid within this space may be actuated by the first and second actuators 130, respectively.

The device 500 may further include a third channel break 450 that may be disposed in the path of the first tapered channel 140. The third channel break 450 may be disposed atop the second fluid processing chip 120b. A third fluid actuator 130 (e.g., resistor) may be disposed proximate to the first tapered channel 140, just prior to the leading edge of the third channel break 450. The third fluid actuator 130 may be positioned a distance from the leading edge of the third channel break 450 such that a volume of fluid within this spaced may be actuated by the third fluid actuator 130. The first tapered channel 140 continues after the third channel break 450 to an edge of the second fluid processing chip 120b.

The device 500 may further include a fluid chamber 470 that may include pillar structures 472. In this example, the fluid chamber 470 may be disposed atop the second fluid processing chip 120b, but may be only coupled to the second tapered channel 140. The fluid chamber 470 may provide a space in which fluid from the second tapered channel 140 may collect to form a larger volume of fluid, this larger volume of fluid may be processed by the second fluid processing chip 120b.

In the example shown at a first (1) stage of operation of the device 500, at least a portion of the volume of fluid from both the first and second fluid reservoirs 215 may be pulled onto the first and second processing chips 120a and 120b. One or both of such micro-volumes of fluid may be processed by the first and second processing chips 120a and 120b. The volumes of micro-fluid pulled onto the first and second processing chips 120a and 120b stops at the leading edge of the first and second channel breaks 450, respectively.

At a second (2) stage of operation of the device 500, the first fluid actuator 130 may be actuated (e.g., heated) to form a vapor drive bubble (not shown) within the micro-volume of fluid within the first tapered channel 140 to push the micro-volume of fluid past the first channel break 450 in the first tapered channel 140. As illustrated, the micro-volume of fluid within the first tapered channel 140 may flow into and may fill the first channel break 450 to close the first tapered channel 140. The micro-volume of fluid may begin to enter the portion of the first tapered channel 140 just after the first channel break 450.

At a third (3) stage of operation of the device 500, the first fluid actuator 130 may be overdriven (e.g., further heated) to form a vapor drive bubble 480 in the micro-volume of fluid within the first tapered channel 140. This vapor drive bubble 480 may prevent further fluid within the first tapered channel 140 and before the first fluid actuator 130 from flowing toward the first channel break 450. This vapor drive bubble 480 may further push a volume of the micro-volume of fluid that is positioned after the first fluid actuator 130 into the first tapered channel 140. The vapor drive bubble 480 may re-form a break within a path in the taper of the first tapered channel 140 such that the directional net driving capillary force imbalance within the first tapered channels 140 again ends at the leading edge of the first channel break 450 and again begins at a trailing edge of the first channel break 450. At the third (3) stage, the second fluid actuator 130 may be actuated (e.g., heated) to form a vapor drive bubble (not shown) within the micro-volume of fluid within the first tapered channel 140 to push the micro-volume of fluid past the first channel break 450 in the first tapered channel 140. As illustrated, this micro-volume of fluid within the second tapered channel 140 flows into and may fill the second channel break 450 to close the second tapered channel. This micro-volume of fluid may begin to enter the portion of the second tapered channel 140 just after the second channel break 450.

At a fourth (4) stage of operation of the device 500, the micro-volume of fluid that was pushed into the first tapered channel 140 in the third (3) stage may continue to move along the first tapered channel 140 toward the third channel break 450. This micro-volume of fluid may stop at a leading edge of the third channel break 450. At the fourth (4) stage, the second fluid actuator 130 may continue to be actuated to form a vapor drive bubble (not shown) within the micro-volume of fluid within the second tapered channel 140 to push the micro-volume of fluid past the second channel break 450 in the second tapered channel 140. As illustrated, the micro-volume of fluid within the first tapered channel 140 continues to flow further into the first tapered channel 140 just after the first channel break 450.

At a fifth (5) stage of operation of the device 500, the third fluid actuator 130 may be actuated (e.g. heated) to form a vapor drive bubble (not shown) within the micro-volume of fluid within the first tapered channel 140 to push the micro-volume of fluid past the first channel break 450 in the first tapered channel 140. The micro-volume of fluid that stopped at the leading edge of the third channel break 450 in the fourth (4) stage of operation of the device 500 then may flow into and may fill the third channel break 450 to close the first tapered channel 140. The micro-volume of fluid may begin to enter the portion of the first tapered channel 140 just after the first channel break 450. At the fifth (5) stage, the micro-volume of fluid that was pumped into the second tapered channel 140 in the fourth (4) stage may continue to move along the second tapered channel 140 toward the fluid chamber 470. The micro-volumes of fluid may flow into and fill the fluid chamber 470 from the second tapered channels 140. The second fluid processing chip 120b may process one or more of the micro-volumes of fluid that enter the third channel break 450 and the fluid chamber 470 from the first and second tapered channels 140, respectively.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

The preceding description has been presented to illustrate and describe examples of the principles described. This description is not intended to be exhaustive or to limit these principles to any precise form disclosed. Many modifications and variations are possible in light of the above teaching. What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A device, comprising:
   a substrate;
   a first fluid processing chip, disposed on the substrate, to process a micro-volume of fluid;
   a second fluid processing chip, disposed on the substrate and co-planar with the first fluid processing chip, to process at least a portion of the micro-volume of fluid;
   a tapered channel disposed between the first and second fluid processing chips, a shape of the tapered channel is configured to provide a directional net driving capillary force imbalanced within the tapered channel to transport the at least the portion of the micro-volume of fluid from the first fluid processing chip to the second fluid processing chip; and
   a fluid actuator, disposed proximate to the tapered channel, to control movement of the at least the portion of the micro-volume of fluid within the tapered channel from the first fluid processing chip to the second fluid processing chip.

2. The device of claim 1, further comprising an air port, coupled to the tapered channel, to normalize a back pressure within the tapered channel.

3. The device of claim 1, wherein the fluid actuator includes a resistor that heats, in response to an actuation voltage applied to the resistor, the at least the portion of the micro-volume of fluid within the tapered channel to generate inertial pumping on the at least the portion of the micro-volume of fluid or form a vapor drive bubble within the at least the portion of the micro-volume.

4. The device of claim 1, further comprising a channel break that separates the tapered channel into first and second tapered channel portions, the first tapered channel portion transporting the portion of the micro-volume of fluid from the first fluid processing chip to the channel break and the second tapered channel portion transporting the portion of the micro-volume of fluid from the channel break to the second fluid processing chip.

5. The device of claim 1, further comprising a fluid interface port disposed through the substrate and including a path to transport a volume of fluid from a fluid store disposed proximate to a back of the device to a third tapered channel.

6. The device of claim 1, further comprising an input/output board connector to connect the device to a computer system that controls an actuation voltage being applied to the fluid actuator and reads process results from the first and second processing chips.

7. The device of claim 1, further comprising a fluid reservoir, disposed on the device, to store a volume of fluid that is pulled into the tapered channel.

8. The device of claim 1, further comprising a chamber disposed on the second fluid processing chip to collect the at least the portion of the micro-volume of fluid.

9. The device of claim 8, wherein the chamber includes a pillar structure or a porous structure to pull the at least the portion of the micro-volume of fluid into the chamber via a directional net driving capillary force imbalanced generated by the pillar structure or a porous structure.

10. A device, comprising:
a substrate;
a first fluid processing chip, disposed on the substrate, to process a micro-volume of fluid;
a second fluid processing chip, disposed on the substrate and co-planar with the first fluid processing chip, to process at least a portion of the micro-volume of fluid;
a tapered channel disposed between the first and second fluid processing chips, a shape of the tapered channel is configured to provide a directional net driving capillary force imbalanced within the tapered channel to transport the at least the portion of the micro-volume of fluid from the first fluid processing chip to the second fluid processing chip; and a resistor, disposed proximate to the tapered channel, to control movement of the at least the portion of the micro-volume of fluid within the tapered channel from the first fluid processing chip to the second fluid processing chip, the resistor heating, in response to an actuation voltage applied to the resistor, the at least the portion of the micro-volume of fluid within the tapered channel to generate inertial pumping on the at least the portion of the micro-volume of fluid or form a vapor drive bubble within the at least the portion of the micro-volume.

11. The device of claim 10, further comprising an air port, coupled to the tapered channel, to normalize a back pressure within the tapered channel.

12. The device of claim 10, further comprising a channel break that separates the tapered channel into first and second tapered channel portions, the first tapered channel portion transporting the portion of the micro-volume of fluid from the first fluid processing chip to the channel break and the second tapered channel portion transporting the portion of the micro-volume of fluid from the channel break to the second fluid processing chip.

13. The device of claim 10, further comprising a fluid interface port disposed through the substrate and including a path to transport a volume of fluid from a fluid store disposed proximate to a back of the device to a third tapered channel.

14. The device of claim 10, further comprising an input/output board connector to connect the device to a computer system that controls an actuation voltage being applied to the fluid actuator and reads process results from the first and second processing chips.

15. The device of claim 10, further comprising:
a chamber disposed on the second fluid processing chip to collect the at least the portion of the micro-volume of fluid; and
a pillar structure disposed within the chamber to pull the at least the portion of the micro-volume of fluid into the chamber via a directional net driving capillary force imbalanced generated by the pillar structure.

16. The device of claim 1, wherein the tapered channel is co-planar with the first and second fluid processing chips to allow for non-impeded transport between the first and second fluid processing chips.

17. The device of claim 1, wherein the shape of the tapered channel is non-straight.

* * * * *